US006795227B2

United States Patent
LeHoty

(10) Patent No.: US 6,795,227 B2
(45) Date of Patent: Sep. 21, 2004

(54) METHOD AND APPARATUS FOR DRIVING LIGHT-MODULATING ELEMENTS

(75) Inventor: David A. LeHoty, Mountain View, CA (US)

(73) Assignee: Silicon Light Machines, Inc., Sunnyvale, CA (US)

(*) Notice: Subject to any disclaimer, the term of this patent is extended or adjusted under 35 U.S.C. 154(b) by 114 days.

(21) Appl. No.: 10/325,105

(22) Filed: Dec. 20, 2002

(65) Prior Publication Data

US 2004/0120025 A1 Jun. 24, 2004

(51) Int. Cl.$^7$ .......................... G02B 26/00; G02B 5/18; G02F 1/01; G06F 15/00; H01S 3/10
(52) U.S. Cl. ...................... 359/290; 359/291; 359/295; 359/238; 359/245; 359/276; 359/572; 358/1.7; 372/26
(58) Field of Search ................................ 359/290, 291, 359/295, 238, 245, 246, 247, 264, 276, 572, 573; 358/1.2, 1.7; 372/26, 38

(56) References Cited

U.S. PATENT DOCUMENTS

| 5,764,664 | A | * | 6/1998 | Yip et al. ...................... 372/26 |
| 6,215,579 | B1 | | 4/2001 | Bloom et al. |
| 6,362,898 | B1 | * | 3/2002 | McDonald .................. 358/1.7 |
| 6,587,248 | B1 | * | 7/2003 | Gyoten ........................ 359/245 |

OTHER PUBLICATIONS

D.M. Bloom, et al, "The Grating Light Valve: revolutionizing display technology" Feb. 1997, 10 sheets, vol. 3013; Projection Displays III Symposium, San Jose, CA.

D.T. Amm, et al. "Grating Light Valve Technology: Update and Novel Applications", May 19, 1998, pp. 1–4, Silicon Light Machines. Presented at Society for Information Display Symposium, Anaheim, CA.

David T. Amm, et al, "Optical Performance of the Grating Light Valve Technology". 1999, pp. 1–8, Silicon Light Machines. Presented at Photonics West–Electronics Imaging.

R.W. Corrigan, et al. "An Alternative Architecture for High Performance Display", Nov. 20, 1999, pp. 1–5, Silicon Light Machines. Presented at SMPTE Technical Conference and Exhibition, New York, NY.

R.W. Corrigan, et al. "Calibration of a Scanned Linear Grating Light Valve Projection System", May 18, 1999, pp. 1–4, Silicon Light Machines. Presented at Society for Information Display Symposium, San Jose, CA.

Robert Corrigan, et al. "Silicon Light Machines—Grating Light Valve Technology Brief", Jun. 2001, pp. 1–8; Sunnyvale, California.

* cited by examiner

Primary Examiner—Loha Ben
(74) Attorney, Agent, or Firm—Okamoto & Benedicto LLP

(57) ABSTRACT

One embodiment disclosed relates to a system for modulating a plurality of micro-electromechanical (MEM) devices. The system includes a means for providing an amplitude modulation signal to each MEM device at a base frequency and a means for providing a width modulation signal at the base frequency. In addition, the system includes a clock means for providing a higher-frequency clock signal with a frequency that is a multiple of the base frequency. In this embodiment, the width modulation signal for each MEM device indicates at least one position on the higher-frequency clock signal.

20 Claims, 12 Drawing Sheets

METHOD AND APPARATUS FOR DRIVING LIGHT-MODULATING ELEMENTS

BACKGROUND OF THE INVENTION

1. Field of the Invention

The present invention relates generally to optical systems. The present invention relates more particularly to microelectromechanical systems (MEMS) for modulating optical signals.

2. Description of the Background Art

A two-dimensional projection image may be formed by using one or more linear arrays of light-modulating elements. The light-modulating elements may comprise, for example, GRATING LIGHT VALVE (GLV) devices or other types of devices that modulate optical signals in a controllable manner. Publications describing GLV devices and their application to display systems include: "The Grating Light Valve: Revolutionizing Display Technology," by D. M. Bloom, Projection Displays III Symposium, SPIE Proceedings, Volume 3013, San Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; and "Optical Performance of the Grating Light Valve Technology," David T. Amm and Robert W. Corrigan of Silicon Light Machines, a paper presented at Photonics West-Electronics Imaging, 1999. Each of the above-mentioned publications is hereby incorporated by reference in its entirety.

Such projection systems may be configured so that a linear array of light modulating elements modulates an incident light beam to display pixels along a column (or, alternatively, a row) of the two-dimensional (2D) image being formed. A scanning system is used to move the column horizontally such that each light-modulating element is able to generate a row of the 2D image. In this way, the entire 2D image is displayed.

SUMMARY

One embodiment of the invention relates to a method for driving a plurality of light-modulating elements. The method includes, for each element, providing an amplitude modulation signal and providing a width modulation signal. Modulation of light by the element is determined with respect to height by the amplitude modulation signal and with respect to width by the width modulation signal.

Another embodiment of the invention pertains to an apparatus for driving a plurality of light-modulating elements. Circuitry is included that provides for each element an amplitude modulation signal at a base frequency. Circuitry is also included that provides for each element a width modulation signal at the base frequency.

Another embodiment of the invention relates to a system for modulating a plurality of micro-electromechanical (MEM) devices. The system includes a means for providing an amplitude modulation signal to each MEM device at a base frequency and a means for providing a width modulation signal at the base frequency. In addition, the system includes a clock means for providing a higher-frequency clock signal with a frequency that is a multiple of the base frequency. In this embodiment, the width modulation signal for each MEM device indicates at least one position on the higher-frequency clock signal.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not to scale unless otherwise noted.

DETAILED DESCRIPTION

Figure 1:
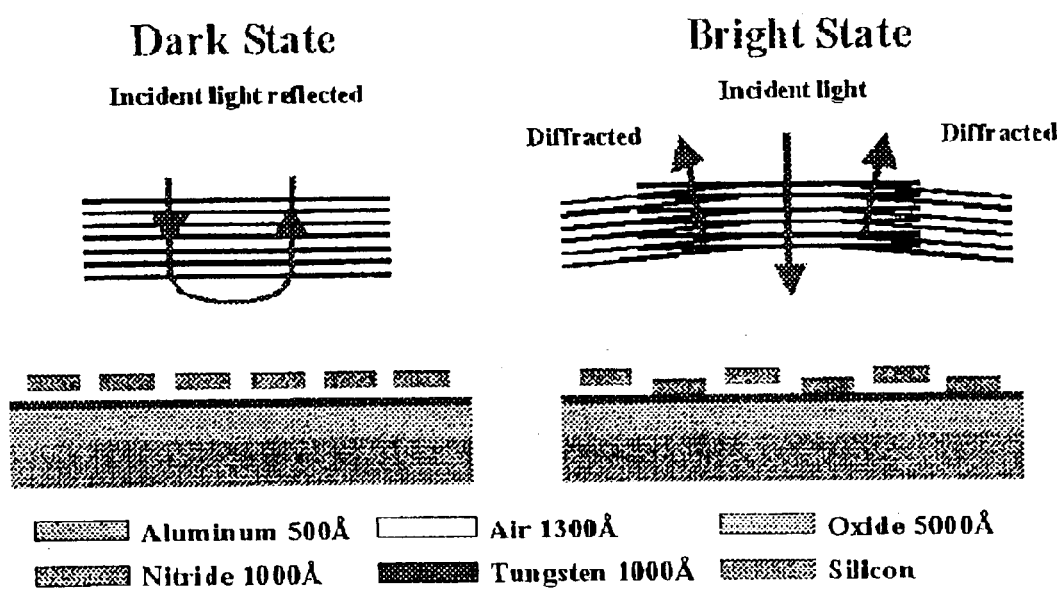
FIG. 1 is a diagram depicting the reflective and diffractive operational states of a conventional GRATING LIGHT VALVE (GLV) element.

FIG. 1 is a diagram depicting the reflective and diffractive operational states of a GRATING LIGHT VALVE (GLV) element. The left side of the diagram depicts the reflective (dark) state, while the right side of the diagram depicts the diffractive (bright) state.

In the example illustrated in FIG. 1, the substrate may comprise a silicon substrate with oxide (for example, about 5000 angstroms thick) overlaying the silicon, and tungsten (for example, about 1000 angstroms thick) overlaying the oxide. The reflective members lie above the tungsten with an air space between the members and the tungsten. For example, three pairs of reflective members (i.e. six members) are shown. The reflective members may, for example, comprise reflective ribbons comprising nitride (for example, about 1000 angstroms thick) with a reflective layer of aluminum (for example, about 500 angstroms thick) on the nitride. Incident light is beamed onto the reflective members. The incident light beam may be at a perpendicular angle to the plane of the substrate.

In the reflective or dark state (left side), all the reflective members are in the same plane, and the incident light is reflected from the surfaces of the members. This reflective state may be called the dark state because it may be used to produce a dark spot (dark pixel) in a projection display system. Such a dark pixel may be produced by blocking the light that is reflected back along the same path as the incident light.

In the diffractive or bright state (right side), alternate ones of the reflective members are deflected downward. This results in the diffraction of the incident light in a direction that is at an angle to the path of the incident light. This reflective state may be called the bright state because it may be used to produce a bright spot (bright pixel) in a projection display system. Such a bright pixel may be produced because the angularly reflected light is not blocked. As discussed further below, the optical response of the element depends on the amount of downward deflection of the alternate members.

Figure 2:
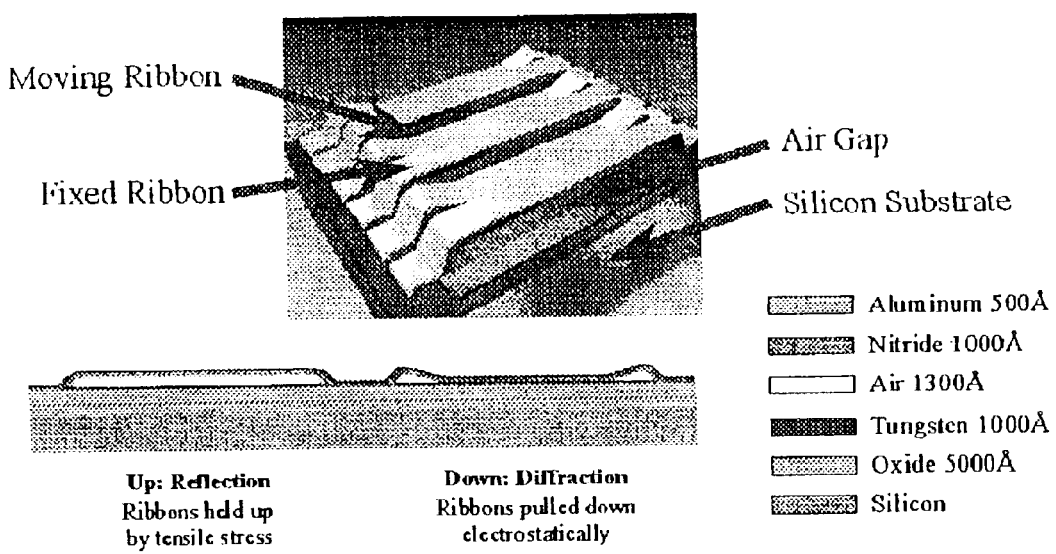
FIG. 2 is an illustration depicting a conventional GLV element comprising pairs of fixed and movable ribbons.

FIG. 2 is an illustration depicting a GLV element comprising pairs of fixed and movable ribbons. As depicted in FIG. 2, the GLV element may include pairs of reflective ribbons, each pair having one fixed and one movable ribbon.

Figure 3:
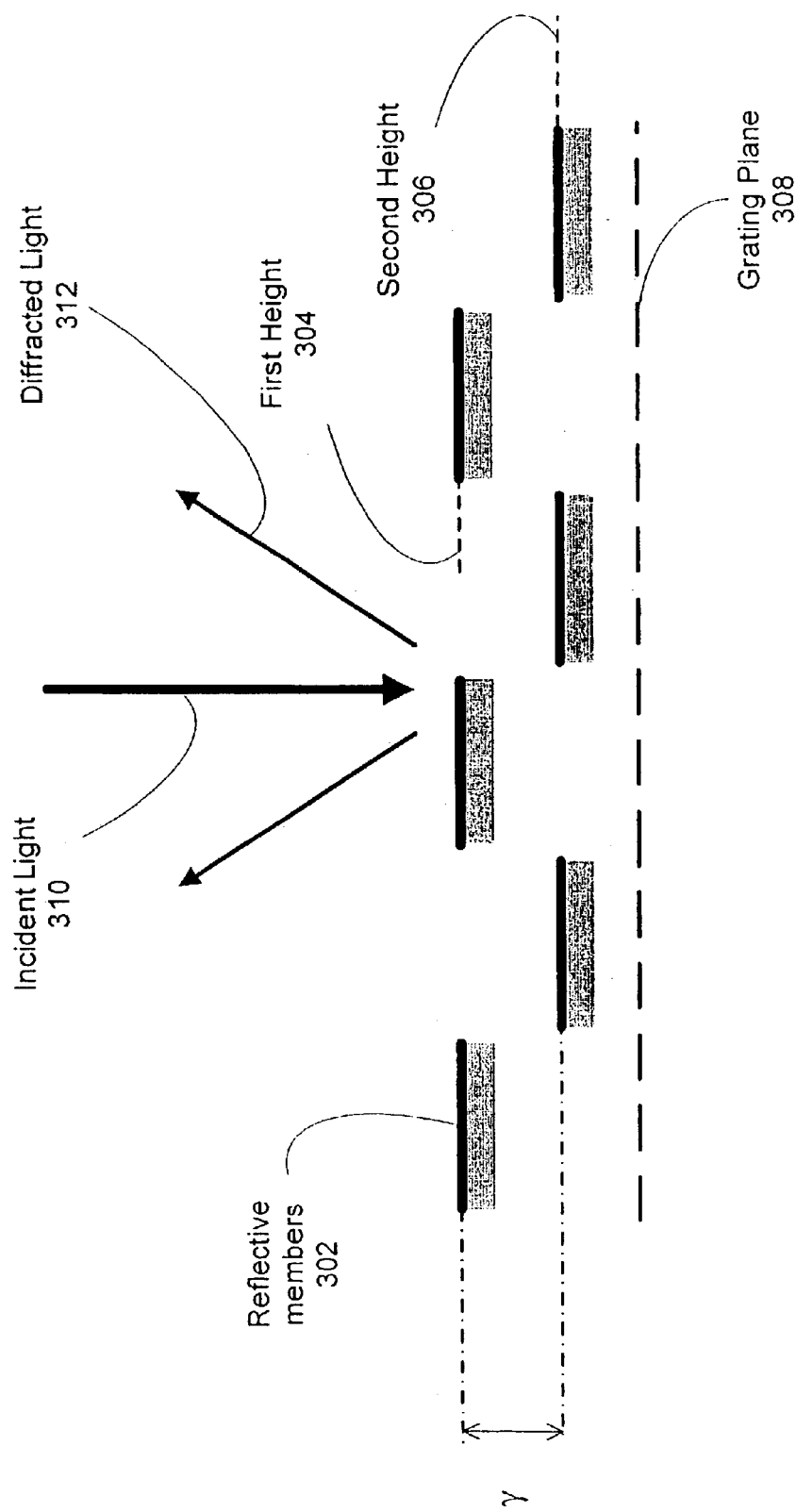
FIG. 3 is a diagram depicting deflections of reflective members for a conventional GLV element in reflective state.

FIG. 3 is a diagram depicting deflections of reflective members for a GLV element in a diffractive state. The GLV element comprises a plurality of reflective members 302. In the example illustrated, the GLV element includes three pairs of reflective members 302 (i.e. six of them).

In the diffractive state, the reflective members are controllably arranged in an alternating configuration at two heights (304 and 306). A first height 304 may correspond to reflective members at a fixed height, while the second height 306 may correspond to reflective members pulled down by application of a voltage.

The grating plane 308 is a theoretical plane that corresponds to the plane on or about which the reflective members are aligned. As illustrated in FIG. 3, the incident light beam 310 impinges upon the element at an angle perpendicular to the grating plane 308. Diffracted light 312 travels away from the element.

The difference between first and second heights may be defined as the deflection distance $\gamma$. The amount of the deflection y may be varied by application of different voltages to control the amount of incident light reflected from the element. When $\gamma$ is near zero, the element would be near a maximally reflective state. When $\gamma$ is near $\lambda/4$, where $\lambda$ is the wavelength of the incident light, the element would be near a maximally diffractive state.

Figure 4:
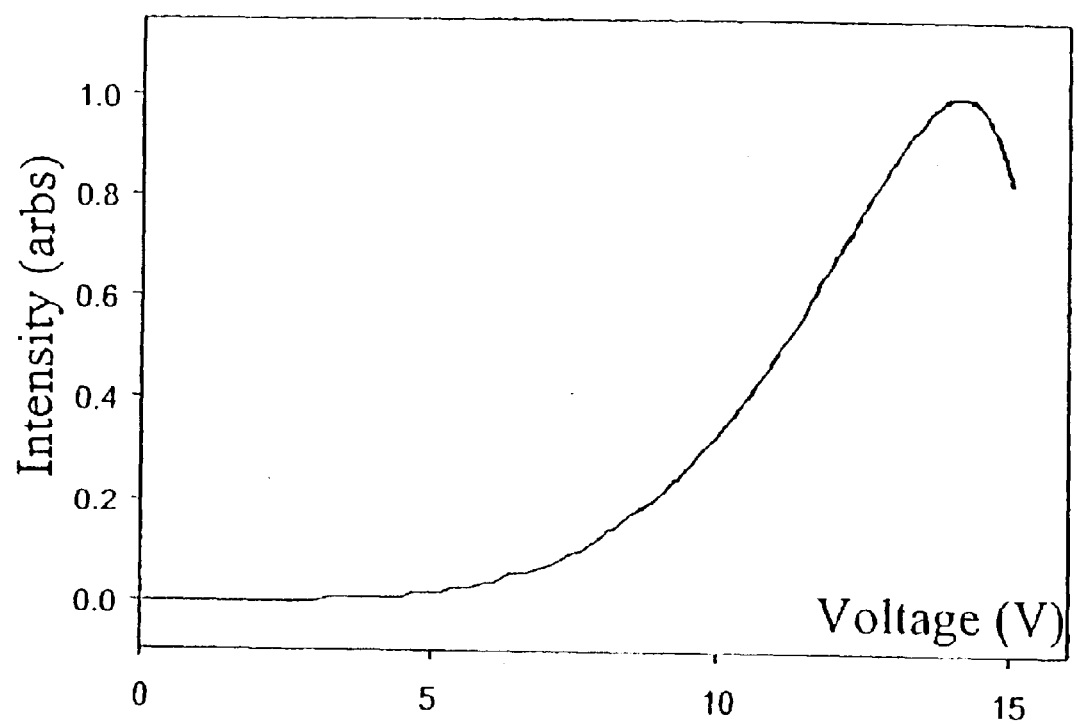
FIG. 4 is a graph illustrating a non-linear electro-optic response for a conventional GLV element.

FIG. 4 is a graph illustrating a non-linear electro-optic response for a GLV element. The graph shows intensity of light (in arbitrary units) versus voltage. The higher the voltage is, the larger is the displacement $\gamma$ of the element. Depending on the voltage applied to the alternate reflective members, the light intensity varies. For the most part, the higher the applied voltage, the higher the light intensity. (This relationship reverses for sufficiently high voltages where the light intensity reduces with higher voltages, and hence the downward slope of the graph at the far right.)

The two states shown in FIG. 1 produce a dark state and a bright state when the optics collect the plus and/or minus first-orders of diffracted light. If the optics collect the zero-order light instead, the left side of FIG. 1 is the bright state and the right side is the dark state. In addition, the intensity versus voltage characteristic of FIG. 4 would show high intensity near zero voltage and low intensity near the rollover voltage for zero-order operation.

Figure 5:
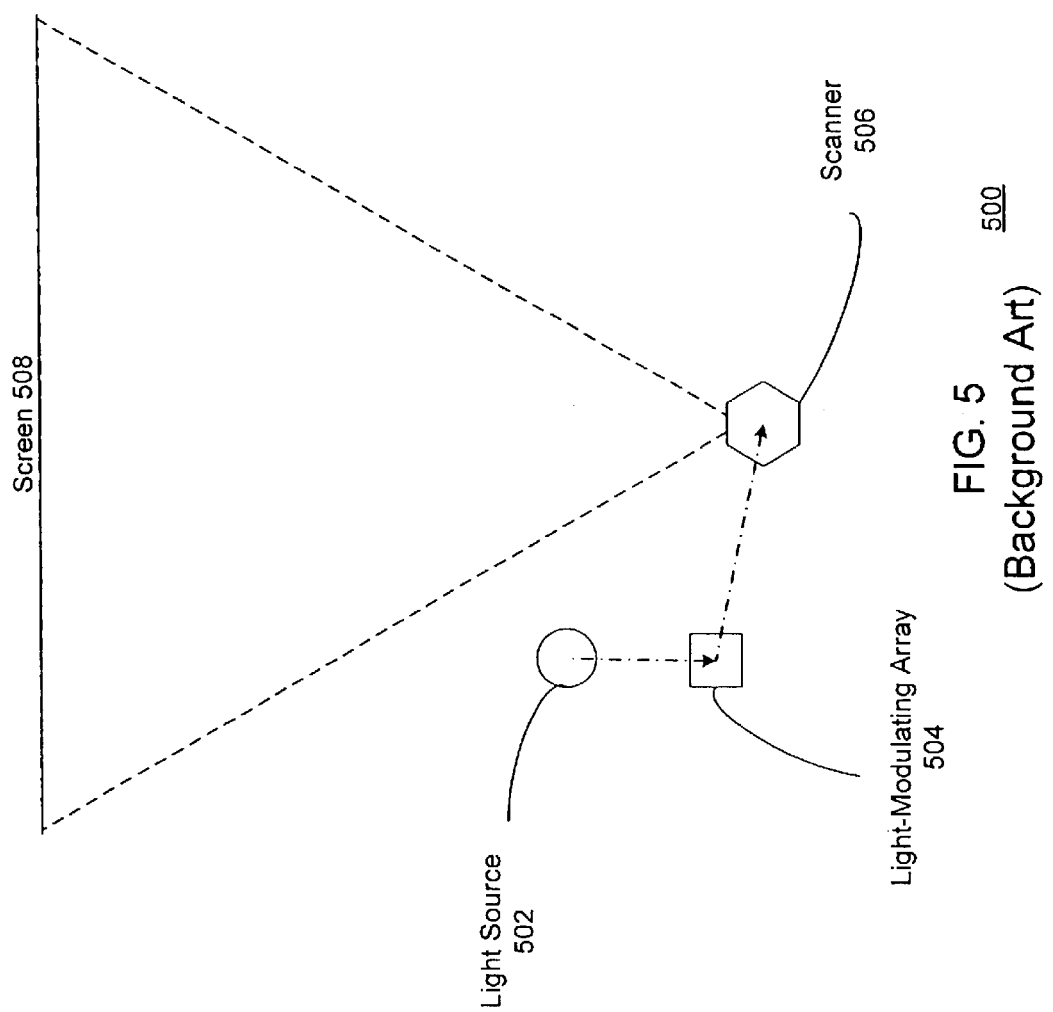
FIG. 5 is a top view depicting a projection display system utilizing an array of light-modulating elements.

FIG. 5 is a top view depicting a projection display system 500 utilizing an array of light-modulating elements. The system 500 includes one or more light sources 502, one or more arrays of light-modulating elements 504, an optical scanner 506, and a screen 508.

The light source 502 may comprise one or more laser light sources. Three laser light sources of different colors may be utilized for a color display system. The light-modulating array 504 may comprise an array of GLV elements (also called GLV "pixels") described above. Each light source 502 may illuminate a light-modulating array 504. Each element of an array 504 modulates the light incident on it to control the amount of light diffracted therefrom. The diffracted light from the elements of the array 504 is then directed to the optical scanner 506.

The optical scanner 506 is used to move the column (or row) of light across the screen 508. Various types of scanners 506 may be used. For example, galvonometer-based scanners, resonant scanners, polygon scanners, rotating prisms, or other types of scanners may be used. A drive signal is applied to the scanner to control ("drive") the movement of the column (or row) of light. For example, to achieve a progressive scan of the column across the screen (e.g., from left to right), a sawtooth drive signal may be used.

Figure 6:
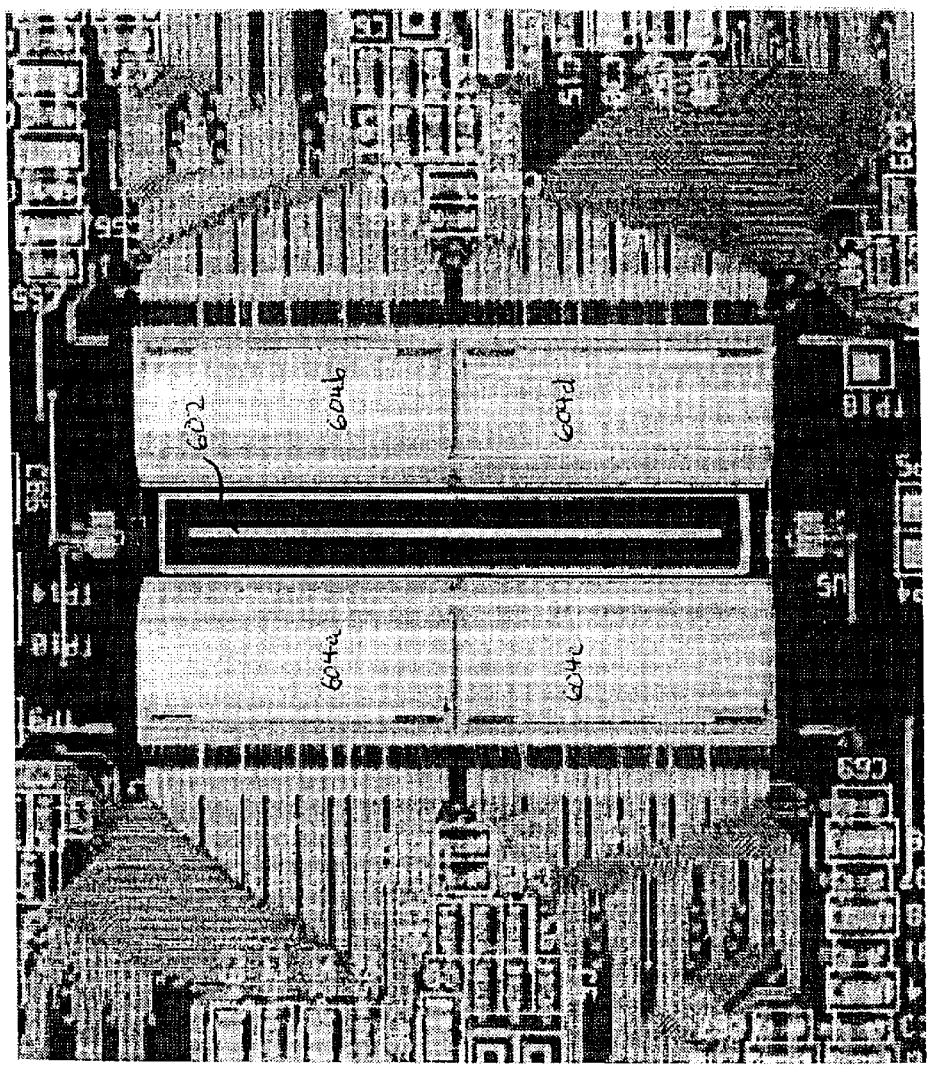
FIG. 6 is a picture showing an example light-modulating array and drivers for the array.

FIG. 6 is a picture showing an example light-modulating array and drivers for the array. The vertical array 602 of light-modulating elements is shown near the center of the picture. The array shown includes 1088 GLV elements or pixels. Surrounding the array 602 are shown four driver integrated circuits (604a, 604b, 604c and 604d). The drivers are configured for line times as short as 4 microseconds (corresponding to a pixel rate of 250 kHz per drive channel) which is adequate to support a 1,920×1,080 HDTV display at a 96 Hz refresh rate. Each driver output is programmable to 256 levels.

Figure 7:
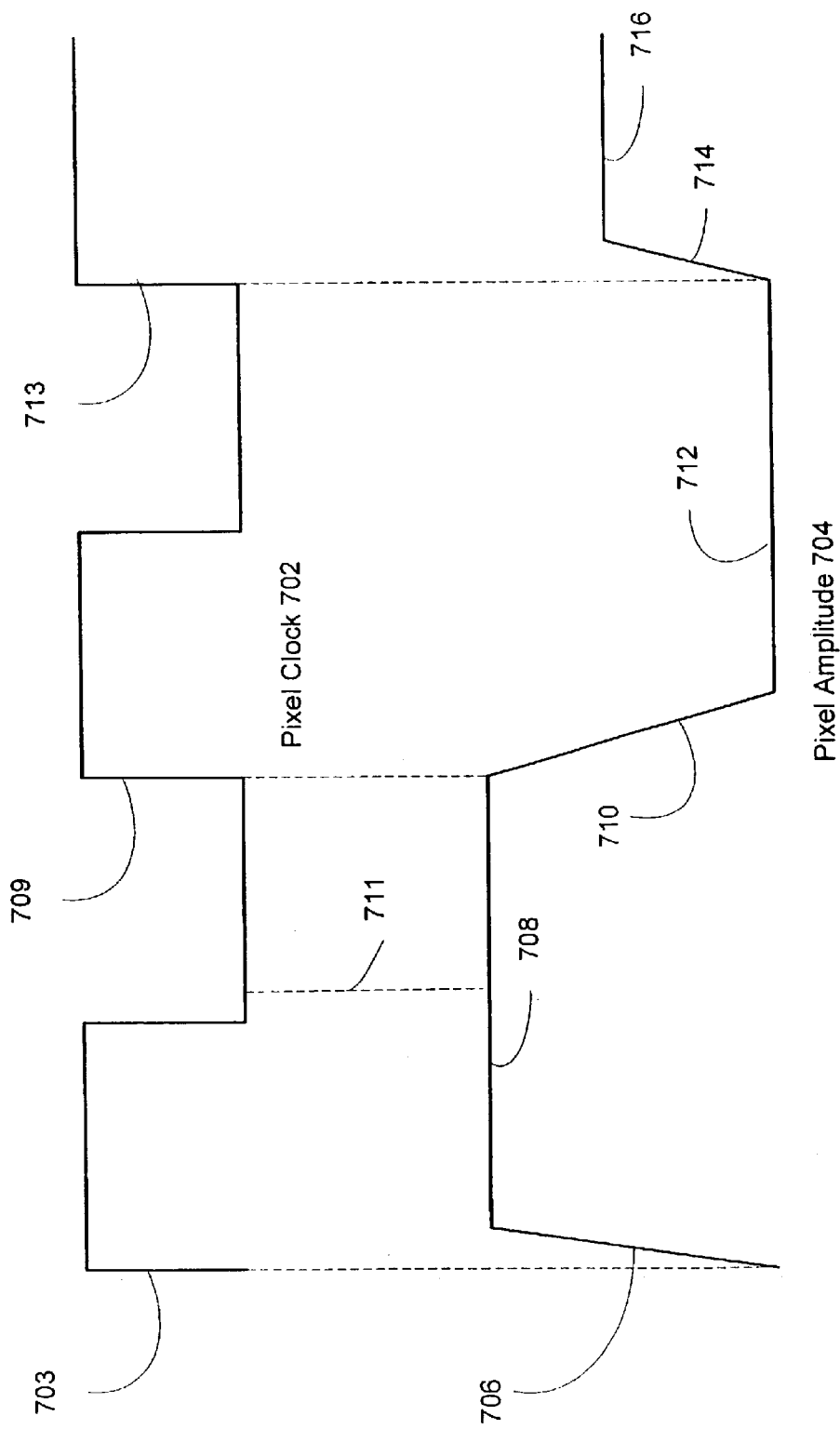
FIG. 7 is a timing diagram that illustrates conventional driving of a GLV-type element.

FIG. 7 is a timing diagram 700 that illustrates conventional driving of a GLV element. The top of the diagram shows a pixel clock 702. The bottom of the diagram shows an example pixel amplitude signal 704 for a particular pixel.

The pixel clock 702 is a clock signal that is provided in common to the various GLV elements. The pixel clock 702 provides the timing for transitioning the pixel amplitude for each pixel from one column (or row) to the next. In this instance, every rising edge indicates that the pixel drivers are transitioned from the amplitude of one column (or row) to the next. For example, the first edge 703 triggers the pixel driver for column (or row) N; the second rising edge 709 triggers the same pixel driver for the next column (or row)

N+1; the third rising edge 713 triggers the same pixel driver for the next column (or row) N+2.

The pixel amplitude signal 704 is generated per GLV element (i.e. per pixel). In other words, the drawing shows a single pixel amplitude signal 704, but there is actually one such signal for each pixel.

At the first rising edge 703 of the pixel clock 702, the pixels are all turned on. In particular, each pixel amplitude signal begins to rise 706 to the appropriate amplitude level 708 as determined by the corresponding amplitude modulation signal. A higher amplitude level typically indicates a higher intensity for that pixel.

At the second rising edge 709 of the pixel clock 702, the pixels are all turned on to an amplitude value that may be different from the last amplitude. In particular, each pixel amplitude signal begins to change 710 to the new level 712. For some types of light-modulating elements, the pixel turn-off time is longer than the pixel turn-on time. This is shown by the lower slope in the falling edge 710 than in the rising edge 706 of the pixel amplitude signal 704. This asymmetry results in the effective center 711 of the pixel being shifted to the right (i.e. towards the side with the lower slope). Such a shift may be undesirable in various applications.

Figure 8:
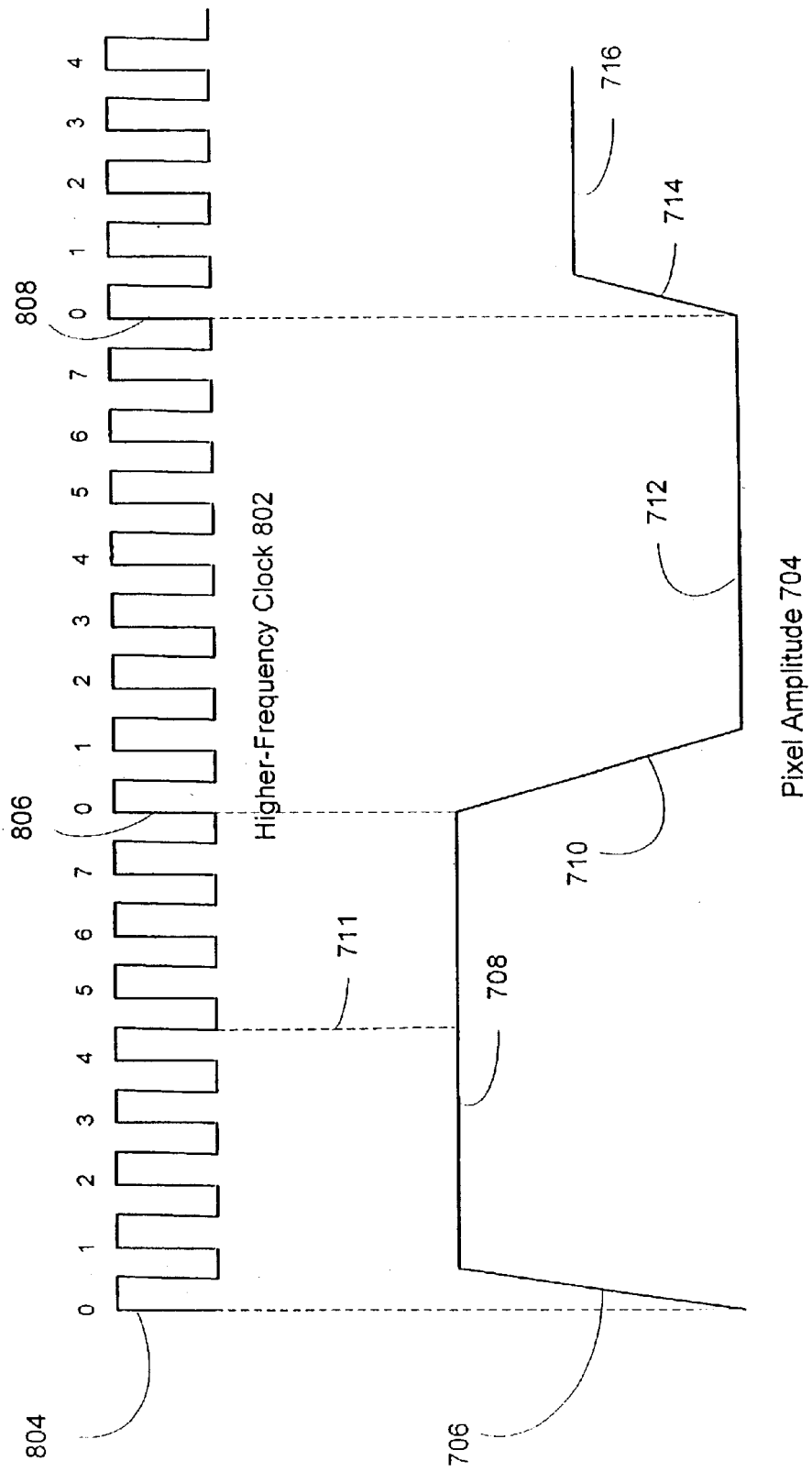
FIG. 8 is a timing diagram that illustrates the driving of a GLV-type element in accordance with an embodiment of the invention.

At the third rising edge 713 of the pixel clock 702, the pixels are again all turned on. In particular, each pixel amplitude signal begins to change 714 to an amplitude level 716 as determined by the corresponding amplitude modulation signal. The operation continues from there with the pixel amplitudes being changed at the clock rising edges FIG. 8 is a timing diagram 800 that illustrates the driving of a GLV-type element in accordance with an embodiment of the invention. The bottom of the diagram shows the same example pixel amplitude signal 704 as in FIG. 7. However, the top of the diagram now depicts a higher-frequency clock signal 804 in accordance with an embodiment of the invention.

The example higher-frequency clock signal 802 has a frequency that is eight times that of the conventional pixel clock signal 702. More generally, the higher-frequency clock signal 802 may have a frequency that is any multiple of the frequency of the conventional pixel clock signal 702. In a preferred embodiment, the multiple may be a power of two so that bits may be advantageously used to indicate positions within the higher-frequency clock 802. The higher frequency clock signal may have a frequency that is equal to or greater than twice the conventional pixel clock signal and does not necessarily need to be an integer multiple of the conventional pixel clock frequency. If both the rising and falling edges of the higher frequency clock signal are utilized, then the actual clock frequency necessary may be reduced.

For the particular pixel illustrated in FIG. 8, the pixel amplitude signal 704 is the same as in FIG. 7. However, the higher-frequency clock 802 triggers transitions in the pixel amplitude signal 704 in a different manner. In the situation illustrated, the transitions are triggered at every eighth rising edge of the higher-frequency clock 802. In particular, every rising edge labeled "0" triggers a transition. At the first "0" rising edge 804, the pixel is turned on. At the second "0" rising edge 806, the pixel amplitude may be changed. At the third "0" rising edge 808, the pixel amplitude may be changed again. And so on.

The higher-frequency clock signal 802 may be used advantageously in various applications. As one example of an advantageous use, the higher-frequency clock signal 802 may be used to compensate for an undesired shift in the center 711 of a pixel due to asymmetry in rise/fall times. Such a correction is described below in relation to FIG. 9.

Figure 9:
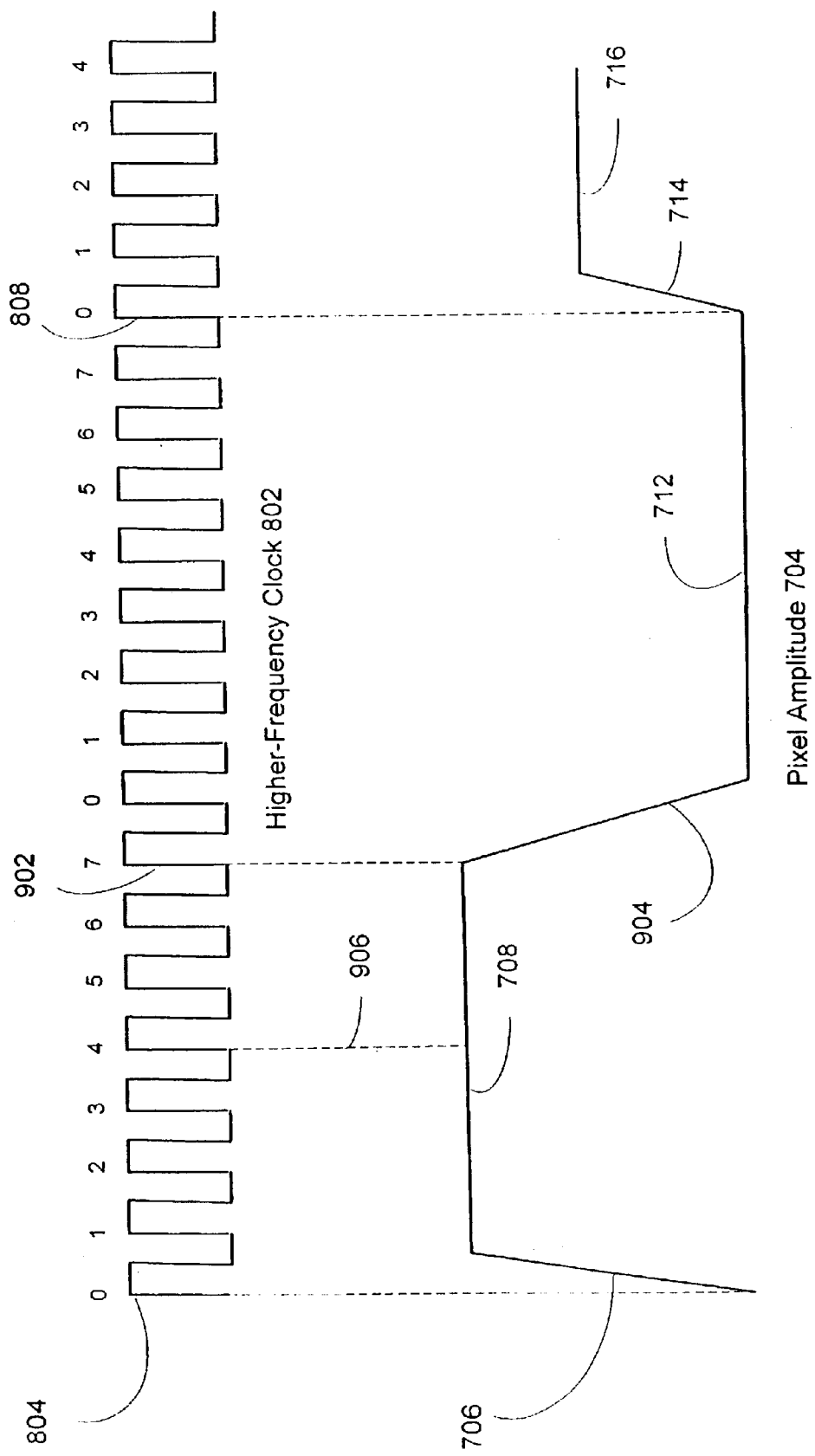
FIG. 9 is a timing diagram that illustrates use of the higher-frequency clock signal to adjust a turn-off time for a pixel.

FIG. 9 is a timing diagram 900 that illustrates use of the higher-frequency clock signal 802 to adjust a turn-off time for a pixel. Here, instead of turning off the pixel at the second "0" rising edge 806, the pixel is turned off at the preceding rising edge 902 (i.e. at the first "7" rising edge). As a result, the falling transition 904 of the pixel amplitude 704 is shifted to the left. This advantageously shifts the effective center 906 of the pixel so as to compensate for the asymmetry in rise/fall times.

More generally, there may be a separate width modulation signal provided for each pixel. In accordance with a preferred embodiment, the width modulation signal comprises a plurality of bits. For example, the width modulation signal or a portion thereof may specify at which rising edge to transition the pixel driver to its next amplitude. Use of such width modulation signals provides support for independently clocking each pixel. In other words, the timing of transitions for each pixel amplitude signal 704 may be adjustable per pixel.

In a preferred embodiment, width modulation bits are appended to amplitude modulation bits for each pixel. This advantageously provides an efficient digital mechanism for controlling both the width and amplitude of each pixel. The interpretation of the width modulation bits can vary with the application. Note that not all of the available high frequency clock (rising and/or falling) edges may be necessary for a possible transition to the next amplitude level.

Note that, in FIGS. 7–9, the pixel amplitude signal 704 differs in level (e.g., 708 and 716) depending on the corresponding amplitude modulation signal. In other embodiments, the signal 704 may instead be a simple on/off signal that indicates whether or not the pixel is to be turned on or off. In such an embodiment, another signal would indicate the amplitude level to be applied in each instance.

In another embodiment, the width modulation bits may be the same for all pixels in the current column (or row or other grouping of pixels) even though the amplitude modulation bits are not the same. In such an embodiment it is not necessary to replicate the width modulation bits for every pixel in the column (or row or other grouping of pixels).

Figure 10:
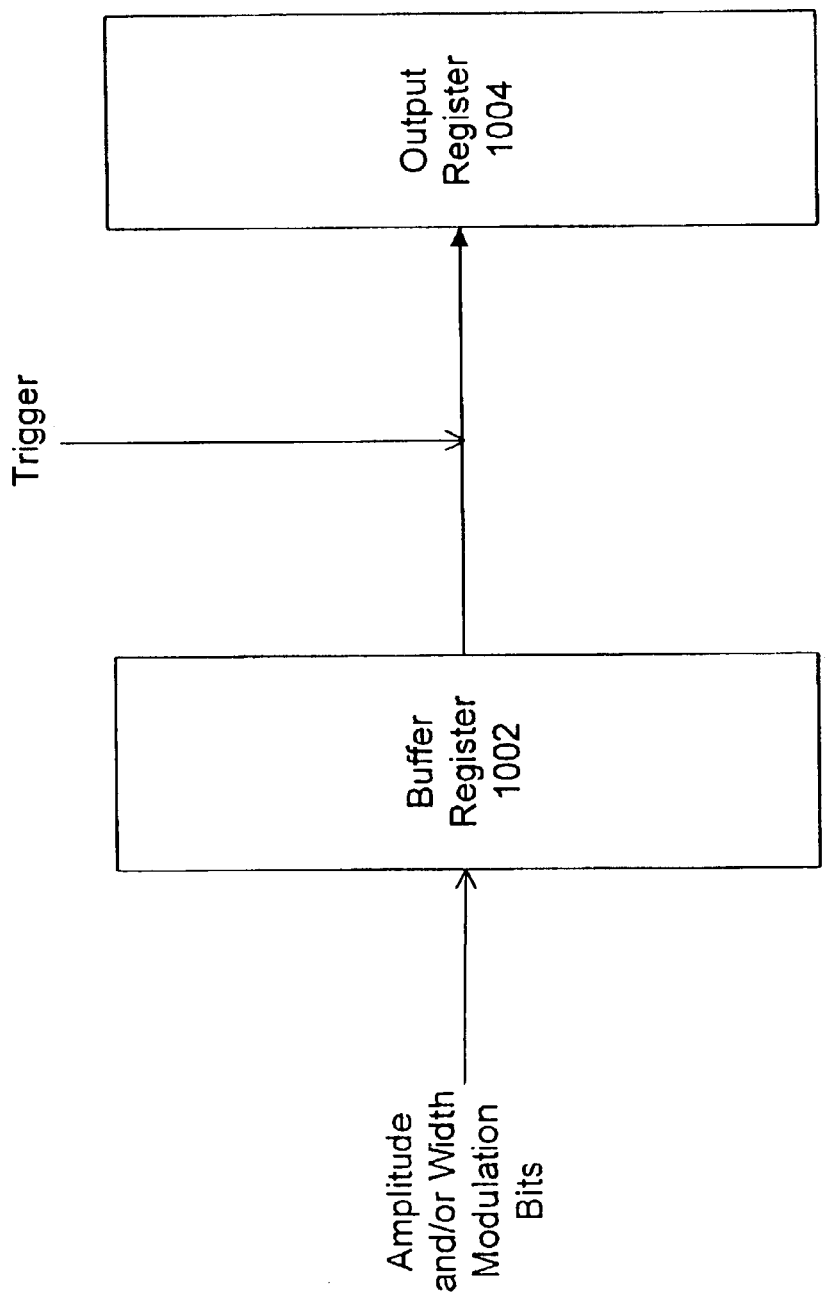
FIG. 10 depicts a schematic diagram of registers for use in controlling a light-modulating element in accordance with an embodiment of the invention.

FIG. 10 depicts a schematic diagram of register system 1000 for use in controlling a light-modulating element in accordance with an embodiment of the invention. The register system 1000 includes a buffer register 1002 and an output register 1004.

The output register 1004 provides the amplitude and/or width modulation bits for use in modulating light by the element. As described above, the amplitude and/or width modulation bits may be used to determine the amplitude of the light modulation applied by the element.

While such an output register 1004 by itself is sufficient in conventional systems where the pixels are clocked simultaneously for all the elements, the output register 1004 alone may be insufficient, in some instances, to avoid synchronization problems when the flexibility of width modulation is provided as described above. To circumvent such potential problems, the buffer register 1002 may be added to work in conjunction with the output register 1004. The buffer register 1002 receives and temporarily holds the next amplitude and/or width modulation bits for the element. The next amplitude and/or width modulation bits are transferred to the output register 1004 upon being triggered. The triggering is preferrably timed such that the next amplitude and/or width modulation bits are not transferred until after the current amplitude and/or width modulation bits in the output register 1004 are no longer needed.

Figure 11:
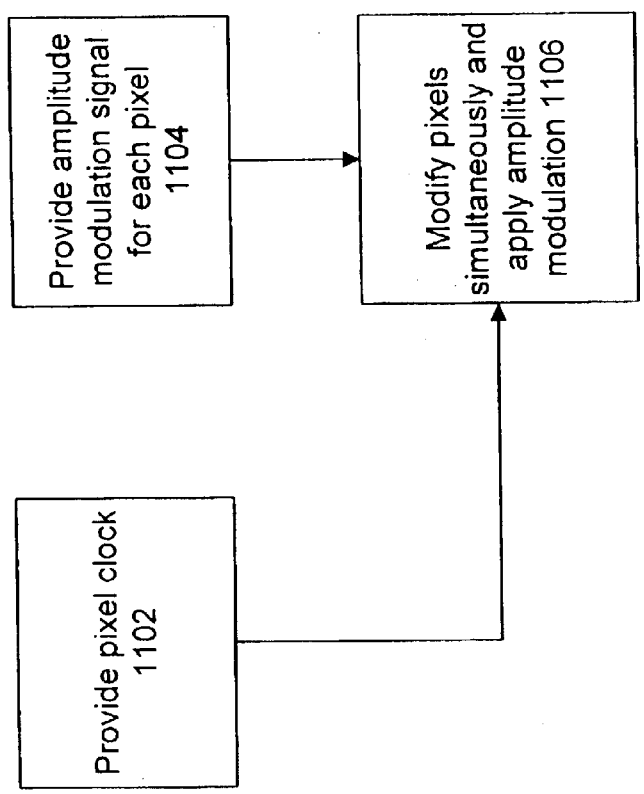
FIG. 11 is a flow chart depicting a conventional method for controlling an array of light-modulating elements.

FIG. 11 is a flow chart depicting a conventional method 1100 for controlling an array of light-modulating elements. In the first step 1102, a pixel clock is provided. The pixel clock may be, for example, the pixel clock 702 described above in relation to FIG. 7. In the second step 1104, amplitude modulation signals are provided for each pixel. As depicted, the second step 1104 is generally performed in parallel with the first step 1102. The third step 1106 uses the pixel clock (from the first step 1102) to turn the pixels on/off simultaneously. In other words, each of the elements in the array begins a pixel at a same time and ends the pixel at a same time. When the pixels are on, each element applies the amplitude modulation (from the second step 1104) to modulate that pixel to the appropriate amplitude level.

Figure 12:
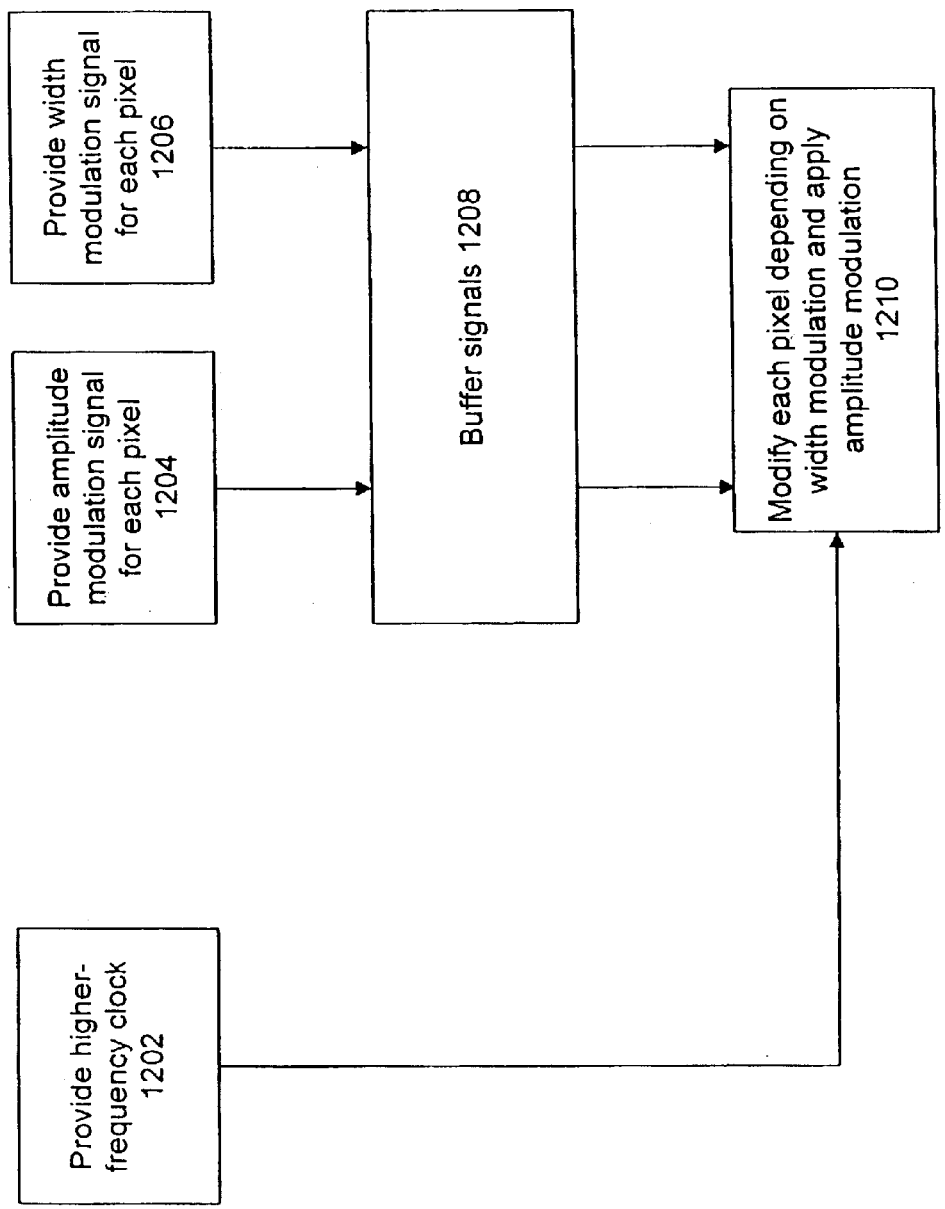
FIG. 12 is a flow chart depicting a method for controlling an array of light-modulating elements in accordance with an embodiment of the invention.

FIG. 12 is a flow chart depicting a method 1200 for controlling an array of light-modulating elements in accordance with an embodiment of the invention. In the first step 1202, a higher-frequency clock is provided. The higher-frequency clock may be, for example, the higher-frequency clock 802 described above in relation to FIGS. 8 and 9. In the second step 1204, amplitude modulation signals are provided for each pixel. In addition, width modulation signals are provided for each pixel in the third step 1206. As depicted, the first three steps (1202, 1204 and 1206) are generally performed in parallel (not one after the other). The fourth step 1208 involves buffering. As described above in relation to FIG. 10, the buffering receives and temporarily stores the amplitude and/or width modulation signals. The buffering may be optional, depending on the application. The fifth step 1210 turns the pixels to the next amplitude modulation level depending on the width modulation signal for each pixel. In other words, when a pixel changes amplitude may be controlled independently for each pixel. For each pixel, when that pixel is on, the corresponding amplitude modulation (from the second step 1204) is applied to modulate that pixel to the appropriate amplitude level.

The method 1200 of FIG. 12 contrasts with the conventional method 1100 of FIG. 11. In the prior conventional method 1100, all the pixels were clocked simultaneously, and the pixel width was not adjustable per pixel. In the method 1200 of FIG. 12, each pixel may be independently clocked to different edges of the higher-frequency clock. In addition, the pixel width is adjustable per pixel.

The present invention may be applied in a driver for a projection display application, such as in a system like that described above in relation to FIG. 5. Alternatively, the invention may be applied in a driver for a computer-to-plate application, such as in systems used in the publishing industry to print magazines and the like. The invention may also be used in other linear scan applications.

In one embodiment, the amplitude and width modulation may be used together to advantageously increase the effective depth (i.e. resolution) of the modulation of a pixel. For example, two pixels may be modulated so as to have the same amplitude but different widths. The wider pixel would effectively appear to be brighter than the narrower pixel.

In another embodiment, the width modulation for a pixel may be varied between image frame refreshes in a display application. For example, the variation of the width modulation may effectively move a pixel about an average pixel position. This may be used to advantageously create effective blur of the pixel for a smoothening effect.

Note that while a preferred embodiment of the invention utilizes GLV or GLV-type elements. In other embodiments, other types of light-modulating elements may be used.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for driving a plurality of light-modulating elements, the method comprising:

for each element, providing an amplitude modulation signal; and for each element, providing a width modulation signal, wherein modulation of light by the element is determined with respect to height by the amplitude modulation signal and with respect to width by the width modulation signal.

2. The method of claim 1, further comprising:

providing a higher-frequency clock signal with a frequency that is a multiple of the pixel clock frequency, wherein the width modulation signal for each element indicates at least one position on the higher-frequency clock signal.

3. The method of claim 2, wherein the at least one position on the higher-frequency clock signal determines a change of a pixel amplitude level.

4. The method of claim 2, wherein the position on the higher-frequency clock signal is indicated, and wherein the the position determines the modulation level change of a pixel.

5. The method of claim 2, wherein the amplitude modulation signal comprises a first plurality of bits representing an amplitude level.

6. The method of claim 5, wherein the width modulation signal comprises a second plurality of bits representing the at least one position on the higher-frequency clock signal.

7. The method of claim 1, wherein a single width modulation signal is common to a grouping of elements.

8. The method of claim 1, wherein the width modulation signal compensates for unequal turn on and turn off times of the element.

9. The method of claim 1, wherein the width modulation signal adjusts an effective center of an amplitude modulated pulse.

10. The method of claim 1, wherein the amplitude and width modulation signals are used together to increase an effective depth of modulation.

11. The method of claim 1, wherein the width modulation signal is varied between image frame refreshes in a display application.

12. The method of claim 11, wherein variation of the width modulation signal effectively moves a pixel about an average pixel location.

13. An apparatus for driving a plurality of light-modulating elements, the apparatus comprising:

circuitry providing for each element an amplitude modulation signal at a base frequency; and circuitry providing for each element a width modulation signal at the base frequency.

14. The apparatus of claim 13, wherein the apparatus comprises a driver for a projection display application.

15. The apparatus of claim 13, wherein the apparatus comprises a driver for a computer-to-plate application.

16. The apparatus of claim 13, further comprising:

a clock for providing a higher-frequency clock signal with a frequency that is at least higher than twice the base frequency, wherein the width modulation signal for each element indicates at least one position on the higher-frequency clock signal.

17. The apparatus of claim 16, wherein the amplitude modulation signal comprises a first plurality of bits representing an amplitude level, and wherein the width modulation signal comprises a second plurality of bits representing the at least one position.

18. The apparatus of claim 17, further comprising, for each element:

a driver circuit for driving modulation of the element; and an output register for providing the amplitude modulation signal to the driver circuit.

19. The apparatus of claim 18, further comprising, for each element:

a buffer register for receiving at least the first plurality of bits and for outputting the bits to the output register in response to triggering.

20. A system for modulating a plurality of micro-electromechanical (MEM) devices, the system comprising:

means for providing an amplitude modulation signal to each MEM device at a base frequency;

means for providing a width modulation signal at the base frequency; and clock means for providing a higher-frequency clock signal with a frequency that is a multiple of the base frequency, wherein the width modulation signal for each MEM device indicates at least one position on the higher-frequency clock signal.

* * * * *

UNITED STATES PATENT AND TRADEMARK OFFICE
CERTIFICATE OF CORRECTION

PATENT NO.   : 6,795,227 B2
DATED        : September 21, 2004
INVENTOR(S)  : David A. LeHoty It is certified that error appears in the above-identified patent and that said Letters Patent is hereby corrected as shown below:

Column 10,
Line 23, after "signal", insert -- to each MEM device --

Signed and Sealed this

Fifth Day of April, 2005

JON W. DUDAS
*Director of the United States Patent and Trademark Office*